United States Patent [19]
Kasuya

[11] Patent Number: 6,134,390
[45] Date of Patent: *Oct. 17, 2000

[54] LENS DRIVING CONTROL APPARATUS FOR ZOOM LENS

[75] Inventor: Junichi Kasuya, Ageo, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/049,641

[22] Filed: Mar. 27, 1998

[30] Foreign Application Priority Data

Apr. 4, 1997 [JP] Japan .................................. 9-086624

[51] Int. Cl.$^7$ ............................. G03B 17/00; G02B 15/14
[52] U.S. Cl. ............................. 396/77; 359/698; 348/358
[58] Field of Search ........................ 396/78, 77; 359/697, 359/698; 348/358

[56] References Cited

U.S. PATENT DOCUMENTS

| | | | |
|---|---|---|---|
| 4,083,057 | 4/1978 | Quinn | 354/25 |
| 4,156,933 | 5/1979 | Pandres, Jr. | 359/698 X |
| 5,204,710 | 4/1993 | Tsukamoto et al. | 354/402 |
| 5,434,621 | 7/1995 | Yu | 348/347 |
| 5,515,204 | 5/1996 | Usui et al. | 359/684 |

OTHER PUBLICATIONS

Patent Abstracts of Japan JP 06 250071 A, Sep. 9, 1994, vol. 18, No. 642.

*Primary Examiner*—W. B. Perkey
*Attorney, Agent, or Firm*—Robin, Blecker & Daley

[57] ABSTRACT

A lens driving control apparatus for a zoom lens includes a zooming operation member for operating a zoom part of the zoom lens, a focusing operation member for operating a focusing lens part of the zoom lens, and a control circuit for driving and controlling the zoom part. The control circuit computes information about driving of the zoom part for substantially preventing a change of angle of view resulting from movement of the focusing lens part, on the basis of an operation signal of the zooming operation member and an operation signal of the focusing operation member or a position signal of the focusing lens part and a position signal of the zoom part, and drives and controls the zoom part in accordance with the computed information.

13 Claims, 3 Drawing Sheets

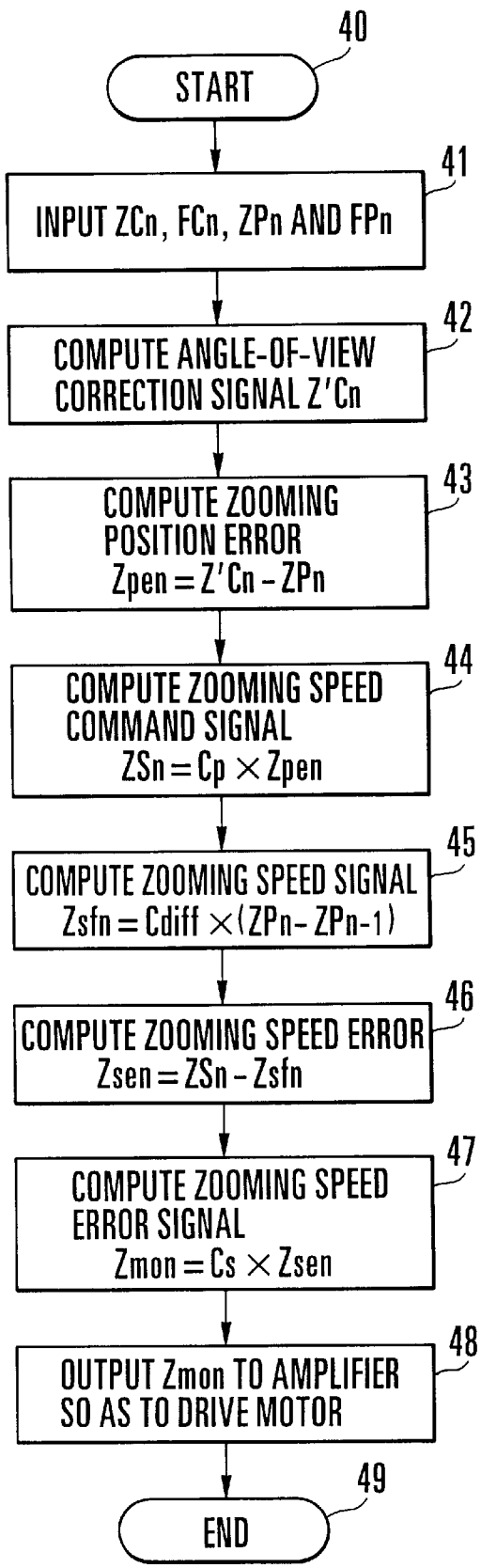

LENS DRIVING CONTROL APPARATUS FOR ZOOM LENS

BACKGROUND OF THE INVENTION

1. Field of the Invention

The present invention relates to a lens driving control apparatus for a zoom lens used in a TV broadcasting camera.

2. Description of Related Art

Operability and mobility are considered important for a color TV camera for TV broadcasting. To meet these requirements, image pickup devices for cameras of this kind have recently become smaller in size. A small CCD (solid-state image sensor) measuring, for example, only ⅔ or ½ inch has come to be most popularly used for reduction in size and weight of a camera as a whole. In view of this trend, zoom lenses for broadcasting color TV cameras also have come to be arranged smaller in size and lighter in weight and to have advanced specifications.

Thus, for specifications and attaining effects of images, it has become one of most important factors for a broadcasting TV camera, in particular, to shorten the so-called M.O.D. (minimum object distance), i.e., the nearest distance at which a zoom lens can take a picture of an object located in front of the zoom lens.

However, the efforts to shorten the M.O.D. encounter a problem that the angle of view (a photo-taking angle of view) is caused to vary by focusing. In a case where the zoom lens is arranged to make focus adjustment with a first lens group disposed foremost on the side of object among other lens groups, i.e., a front lens group, this problem particularly becomes manifest. An art for solving this problem has been known, for example, from a disclosure made in U.S. Pat. No. 4,083,057.

BRIEF SUMMARY OF THE INVENTION

It is an object of the invention to provide a zoom lens which is arranged to eliminate the possibility of having a change of photo-taking angle of view caused by focusing, without necessitating any changes or modifications of the optical and mechanical arrangements of the zoom lens.

To attain this object, in accordance with an aspect of the invention, there is provided a lens driving control apparatus having a zooming operation member (unit) for operating a zoom part of the zoom lens and a focusing operation member (unit) for operating a focusing lens part of the zoom lens and arranged to drive the zoom part and the focusing lens part on the basis of operation command signals from the zooming and focusing operation members, in which information about driving of the zoom part for correcting a change of angle of view resulting from driving of the focusing lens part is computed on the basis of the operation command signal of the zooming operation member and the operation command signal of the focusing operation member or a position signal of the focusing lens part and a position signal of the zoom part, and the computed information is used as a zooming command signal for the zoom part.

Further, in particular, the lens driving control apparatus is provided with storage means for storing data necessary in computing a lens moving amount of the zoom part for correcting a change of angle of view resulting from driving of the focusing lens part. The lens moving amount computing operation can be speedily carried out by using the stored data. More specifically, the data stored by the storage means includes a group of coefficients of a proximate plane passing at least three of four dividing points obtained with a zooming range of the zoom part and a focus shifting range of the focusing lens part respectively divided into parts at dividing points and with positions of the zoom part and the focusing lens part at the dividing points and an angle of view determined by the two positions used as parameters.

The above and other objects and features of the invention will become apparent from the following detailed description of a preferred embodiment thereof taken in conjunction with the accompanying drawings.

BRIEF DESCRIPTION OF THE SEVERAL VIEWS OF THE DRAWING

FIG. 3 is a flow chart showing an overall flow of zooming control to be performed during each sampling.

DETAILED DESCRIPTION OF THE INVENTION

Hereinafter, a preferred embodiment of the invention will be described in detail with reference to the drawings.

Figure 1:
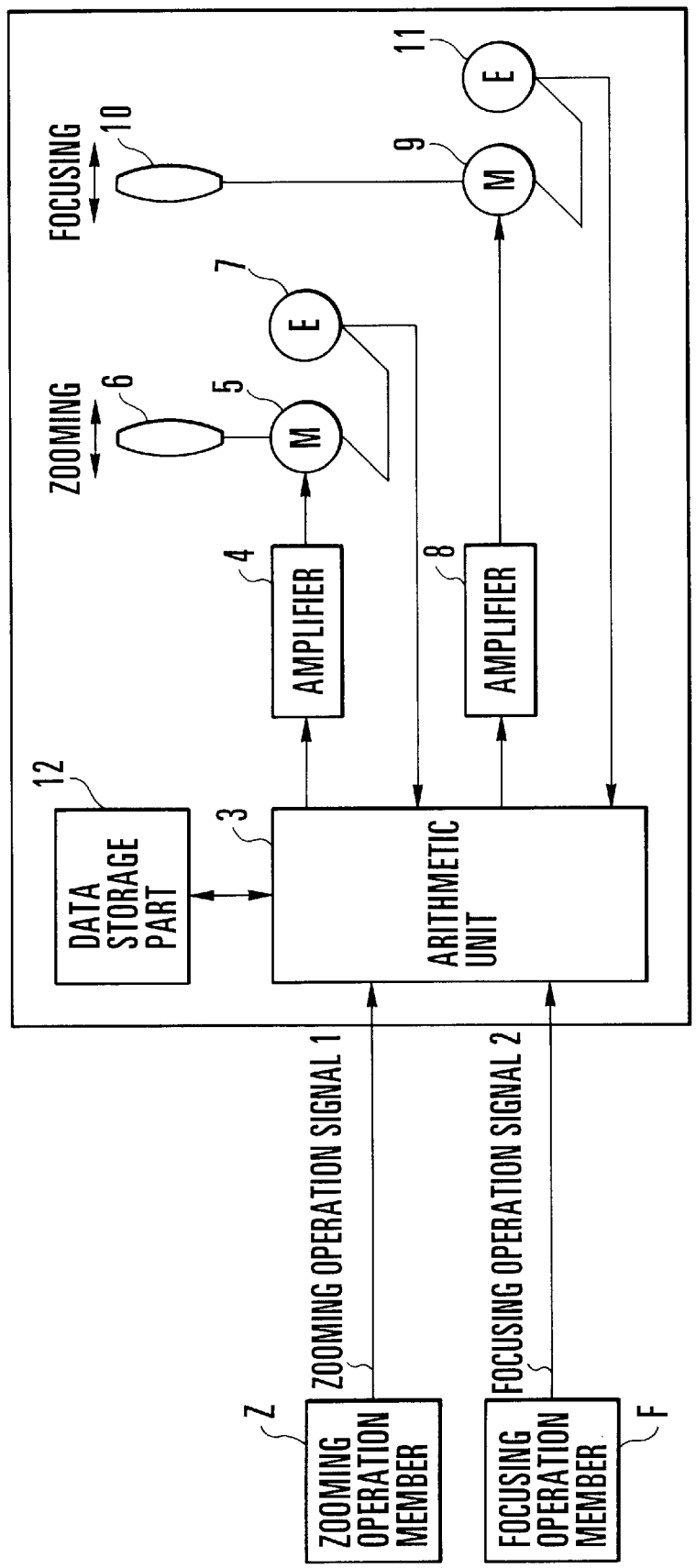
FIG. 1 is a block diagram showing the arrangement of a lens driving control apparatus according to an embodiment of the invention.

FIG. 1 is a block diagram showing the arrangement of a lens driving control apparatus according to the embodiment of the invention. Referring to FIG. 1, a zooming operation member Z is arranged to output a zooming operation signal 1 which is, for example, a demand or command for zooming. A focusing operation member F is arranged to output a focusing operation signal which is, for example, a demand or command for focusing. The zooming operation signal 1 and the focusing operation signal 2 are connected to an arithmetic unit 3 which is a microcomputer or the like.

One output of the arithmetic unit 3 is connected serially to an amplifier 4 and a motor 5 to drive a zooming lens 6 (a zoom part) which is arranged to perform a zooming function as a driven member. The output of a position detector 7 which is arranged to detect the position of the zooming lens 6 is connected to the arithmetic unit 3 for feedback control.

The other output of the arithmetic unit 3 is serially connected to an amplifier 8 and a motor 9 to drive a focusing lens 10 (a focusing lens part) which is arranged to perform a focusing function as a driven member. The output of a position detector 11 which is arranged to detect the position of the focusing lens 10 is connected to the arithmetic unit 3 for feedback control.

A data storage part 12 (EEPROM) is arranged to store beforehand data necessary for an angle-of-view correcting computing operation as will be described later herein. In carrying out a series of computing actions for correcting a change of angle of view caused by focusing, the data stored in the data storage part 12 is used by the arithmetic unit 3. The details of the data stored in the data storage part 12 will be described later herein.

With the embodiment arranged in the above-stated manner, when the operator of the apparatus operates the zooming operation member Z for adjusting the focal length, the zooming operation signal 1 varies according to the amount of the operation. The focusing operation signal 2 likewise varies according to the amount of operation when the focusing operation member F is operated for adjusting a distance to the object of shooting.

The arithmetic unit 3 receives the operation signals 1 and 2, at every interval of a predetermined sampling time, respectively as data for a zoom command signal ZCn and as data for a focusing command signal FCn. The arithmetic unit 3 stores these data obtained up to a time point at least one sampling time before the current sampling time, i.e., as data "ZCn−1 and FCn−1", wherein "n" indicates an n-th time sampling. The zooming operation signal 1 from the zooming operation member Z is a so-called speed signal which indicates the speed of zooming. Therefore, a signal obtained by adding the speed signal received at every sampling time to the position signal computed one sampling time before is considered to be the zoom command signal ZCn.

Further, the arithmetic unit 3 receives the output of the position detector 7 which indicates the position of the zooming lens 6 (having a zooming function) and the output of the position detector 11 which indicates the position of the focusing lens 10 (having a focusing function), also at every sampling time, respectively as a zooming position signal ZPn and a focusing position signal FPn. The data of these signals is also stored up to a time point at least one sampling time before the current sampling time as data "ZPn−1 and FPn−1". By using these input signals and the data stored in the data storage part 3, the arithmetic unit 3 computes a reference angle of view. The zooming position signal used for this computing process is stored as a reference zooming position signal ZPorg. After that, a driving amount $\delta$Zn for the zooming lens 6 to be used for correcting a change of angle of view caused by a change in the position of the focusing lens 10 is computed. The driving amount $\delta$Zn thus computed is added to the reference zooming position signal ZPorg which is used in computing the reference angle of view. As a result, a new zoom command signal Z'Cn is obtained (Z'Cn=ZPorg+$\delta$Zn).

The slight change of angle of view caused when a focusing operation is performed by the operator is corrected by driving the zooming lens 6 under position control performed with the above-stated zoom command signal Z'Cn.

FIG. 3 shows in a flow chart the flow of the overall zooming control operation performed at each sampling time.

The arithmetic unit 3 starts the flow of the control operation from a step 40 at every sampling time. At a step 41, position signals FPn and ZPn indicating the new positions of the focusing lens 10 and the zooming lens 6, a focusing command signal FCn and a zoom command signal ZCn are inputted. The command signals and the position signals which have been obtained at the last sampling time (n−1) are likewise inputted and stored, although this action is not shown in the flow chart.

At a step 42, a zoom command signal Z'Cn which is an angle-of-view correction signal is computed and obtained from the above-stated information signals. The details of the process of computing the angle-of-view correction signal Z'Cn will be described later with reference to FIG. 2 which is a flow chart.

Steps 43 through 49 are steps of converting the angle-of-view correction signal Z'Cn into a zooming speed error signal and sending the zooming speed error signal to the motor 5 which drives the zooming lens 6.

At the step 43, a zooming position error Zpen is computed by subtracting, from the zoom command signal Z'Cn which is the angle of view correction signal, the zooming position signal ZPn which is sampled at the same sampling time (Zpen=Z'Cn−ZPn). In other words, a difference between a current zooming position and a zooming position which is a target of correction is obtained by this step.

At the step 44, in order to convert the position error into a speed signal, a zooming speed command signal ZSn is computed by multiplying the zooming position error Zpen by a proportional multiplier Cp which is a position loop gain (ZSn=Cp×Zpen).

At the next step 45, a difference between the zooming position signal ZPn obtained by the current sampling and a zooming position signal ZPn−1 obtained one sampling time before is multiplied by a certain constant Cdiff, thereby obtaining a zooming speed signal Zsfn [Zsfn=Cdiff×(ZPn−ZPn−1)].

At the step 46, a zooming speed error Zsen is computed by subtracting the zooming speed signal Zsfn from the zooming speed command signal ZSn computed at the step 44 (Zsen=ZSn−Zsfn).

At the step 47, a zooming speed error signal Zmon is computed by multiplying the zooming speed error Zsen by a proportional multiplier Cs which is a speed loop gain (Zmon=Cs×Zsen).

At the step 48, the motor 5 is driven by sending the zooming speed error signal Zmon to the amplifier 4. With the zooming lens 6 controlled in this manner, a series of actions to be carried out at every sampling time comes to an end.

With respect to focusing, the focusing lens 10 is controlled, without computing any new command signal, by carrying out position control processes similarly to the processes performed for zooming as described above and by using the focusing operation signal 2 outputted from the focusing operation member F.

Figure 2:
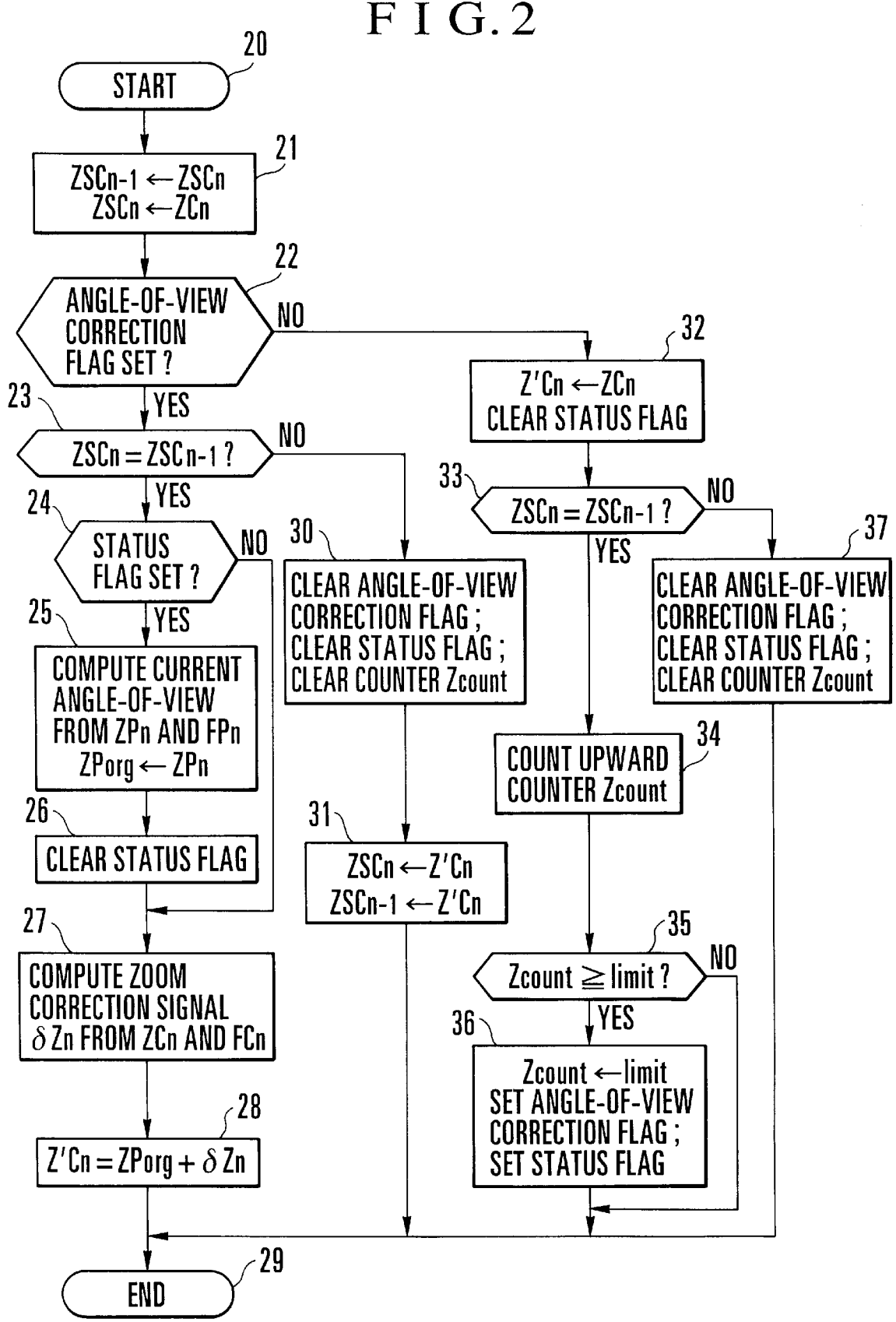
FIG. 2 is a flow chart showing in outline a computing operation for obtaining a zoom command signal for correcting a change of angle of view resulting from a change in position of a focusing lens.

FIG. 2 is a flow chart showing in outline a computing operation for the zoom command signal Z'Cn used for correction of a change of angle of view caused by a change in position of the focusing lens 10.

After the zoom command signal ZCn, the zooming position signal ZPn, the focusing command signal FCn and the focusing position signal FPn are inputted at each sampling time, the arithmetic unit 3 comes to the start of the flow of operation at a step 20 in FIG. 2. Since the zooming operation signal 1 is a speed signal in this case, in order to convert the speed signal into a position signal, the zoom command signal ZCn for the n-th sampling time is computed by adding a zoom command signal $\delta$ZCn obtained by the current sampling to a zoom command signal ZCn−1 obtained at the (n−1)-th sampling time (ZCn=ZCn−1+$\delta$ZCn).

At a step 21, for computing operations to be carried out later, the current zoom command signal and the zoom command signal obtained one sampling time before are stored. As mentioned above, a zooming position signal, a focusing position signal, a zoom command signal and a focusing command signal have been stored also at the last sampling time (n−1).

At a step 22, for deciding whether an angle-of-view correcting function is to be made effective, a check is made to find if an angle-of-view correction flag is set. If so, the flow proceeds to a step 23. A process for setting the angle-of-view correction flag will be described later at a step 36.

At a step 23, a check is made to find if the angle-of-view correcting function is effective for the current sampling by comparing the zoom command signal obtained by the current sampling with the zoom command signal obtained one sampling time before. If so, the flow proceeds to a step 24. In other words, at the step 23, a check is made for a zooming operation. No correction of a change of angle of view caused by focusing is made if zooming is in process. If so, priority is given to zooming.

At the step 24, a check is made for the state of a status flag which is provided for computing a reference angle of view. If the status flag is found to be set, the flow proceeds to a step 25. At the step 25, an angle of view to be used as a reference value is computed and obtained from the current zooming position signal ZPn and the current focusing position signal FPn. The zooming position signal ZPn which is thus obtained is stored as a reference zooming position signal ZPorg. If the status flag is found at the step 24 to be not set, the flow jumps to a step 27, because it is not necessary to compute any reference angle of view nor to store any reference zooming position. After completion of the computing operation of the step 25, the flow proceeds to a step 26. At the step 26, the status flag is cleared to prevent a reference angle of view from being computed and a reference zooming position from being stored at the next sampling time. The status flag is cleared for the following reason. Upon completion of a zooming operation, an angle-of-view correcting action must be performed for correcting a change of angle of view caused by a focusing action. For this purpose, an angle of view which is obtained when the zooming operation is judged to have come to an end is retained as a reference angle of view.

At the step 27, a zoom correction signal δZn is computed by using the reference angle of view which has previously been computed, the current zoom command signal ZCn (ZSCn) and a focusing command signal FCn. In computing the zoom correction signal δZn, an angle of view and a zooming position which have been obtained as reference values when completion of the zooming operation has been decided are also used in addition to the above stated signals. This computing operation will be described in detail later by using a computing formula.

At a step 28, a new zoom command signal Z'Cn is computed by adding together the computed zoom correction signal δZn and the reference zooming position signal ZPorg previously stored. With the computing operation for the correction of angle of view to be corrected thus having been finished, the flow proceeds to a step 29. The flow then shifts to the step 43 of the flow chart of FIG. 3 to carry out the position control computing process for control over the zooming lens 6.

With the current zoom command signal compared with the previous zoom command signal at the step 23, if the zoom command signal is found to have changed, thus indicating that a zooming operation is in process, the flow proceeds from the step 23 to a step 30. At the step 30, flags necessary for a series of computing processes are initialized without performing any angle-of-view correcting computing process. At the next step 31, to let the command signal retain continuity, a corrected zoom command signal Z'Cn obtained one sampling time before is substituted into the current zoom command signal ZSCn and the zoom command signal ZSCn−1 of the last sampling time which are respectively in store. The values thus obtained are stored, and the flow proceeds to the step 29 to bring the computing operation to an end.

With the check made for the state of the angle-of-view correction flag at the step 22, if the angle-of-view correction flag is found to be not set, the flow branches to a step 32. At the step 32, a sampled zoom command signal ZCn is substituted into the zoom command signal Z'Cn, without performing the angle-of-view correction, and the status flag which is provided for computing a reference angle of view is cleared. After that, a check is made for occurrence of a condition requiring resumption of the angle-of-view correction.

At a step 33, the zoom command signal obtained by the current sampling and the zoom command signal obtained one sampling time before, which are previously stored, are compared with each other. If they are found to be equal to each other, thus indicating no change, the flow proceeds to a step 34. In other words, the step 33 is provided for finding if a zooming operation is in process.

Steps 34, 35 and 36 are flag setting processes. In other words, when no zooming operation is found for a prescribed period of time, the angle-of-view correction flag which is provided for correcting a change of angle of view caused by focusing and the status flag which is provided for computing a reference angle of view are set.

At the step 34, the count (Zcount) of a counter for resuming the angle-of-view correction is caused to count up, and the flow proceeds to the step 35. At the step 35, a check is made to find if the count Zcount has reached a prescribed limit value. If so, the flow proceeds to the step 36. At the step 36, in order to prevent the overflow of the value of the count Zcount, the limit value is substituted into the count Zcount. Further, the angle-of-view correction flag and the status flag are set to bring about a state of allowing the commencement of an angle-of-view correcting action and the computation of a reference angle of view at the next sampling time. If the count Zcount is found at the step 35 to be not at the limit value as yet, the flow proceeds to the step 29 for execution of the normal position control. The angle-of-view correction flag which is provided for correcting a change of angle of view caused by focusing and the status flag which is provided for computing a reference angle of view are thus set only after no zooming operation is found for a predetermined period of time.

In a case where the zoom command signal is found at the step 33 to have changed (thus indicating that a zooming operation is in process), the flow proceeds to a step 37. At the step 37, the angle-of-view correction flag, the status flag and the count Zcount are cleared. The flow then proceeds to the step 29 for the normal position control.

The flow of operation described above shows in outline the processes of computing the command signal Z'Cn for controlling the zooming lens 6 for the purpose of correcting a change of angle of view caused by a change in position of the focusing lens 10.

Next, the processes of computing the angle of view and the zoom correction signal included in the flow of operation shown in FIG. 2 are further described in detail as follows. For carrying out these two computing processes, the results of computation performed as described below are assumed to be stored in a storage area of the data storage part 12 shown in FIG. 1.

The range of driving the zooming lens 6 from the end point of wide-angle side to the end point of telephoto side is divided into an arbitrary number n of parts, while the range of driving the focusing lens 10 from the end point of infinity distance side to the end point of nearest distance side is also divided into an arbitrary number m of parts. The pulses outputted from the position detectors (encoders) 7 and 11 are respectively computed according to the divided parts. An angle of view at an dividing point of zooming and a j-th dividing point of focusing is obtained beforehand by optical computing processes. Similarly, an angle of view at the i-th dividing point of zooming and a (j+1)-th dividing point of focusing, an angle of view at an (i+1)-th dividing point of zooming and the j-th dividing point of focusing, and an angle of view at an (i+1)-th dividing point of zooming and the (j+1)-th dividing point of focusing are also obtained by optical computing processes. Then, an approximation process is carried out, for an area surrounded by these four dividing points, on a plane passing through predetermined three of the four dividing points.

Generally, a plane is expressed as "ax+by+cz+d=0". An angle of view ω can be likewise expressed by a function obtained by using a focal length and a focusing position as variables. By applying this formula, the current state of angle of view can be expressed as "ω=Cz×Pz+Cf×Pf+D". In the formula, ω represents the size of the angle of view, Cz a coefficient of the proximate plane for a zooming position, Pz a zooming position, Cf a coefficient of the proximate plane for a focusing position, Pf a focusing position, and D a constant term of the proximate plane.

The values of the coefficients Cz, Cf and D thus obtained are arranged in a map. The map thus obtained is stored beforehand in a storage area of the data storage part 12 to be used for processes of computing an angle of view and computing a zooming lens driving amount which is necessary for the angle-of-view correction. In the case of the embodiment, a value "1/Cz" is also mapped and stored in addition to these three coefficients for the purpose of increasing the speed of computation.

In computing a reference angle of view, an applicable proximate plane area is obtained by using the zooming position signal ZPn and the focusing position signal FPn obtained by the current sampling. Then, by using the data (Czij, Cfij, Dij) of the map in store, an angle of view ωorg which is to be used as the reference angle of view is computed (ωorg=Czij×ZPn+Cfij×FPn+Dij).

Next, a zooming lens driving amount δZn+1 for correcting a change of angle of view which is caused by focusing at the time of the (n+1)-th sampling is computed as follows. With, at the (n+1)-th sampling, a zoom command signal assumed to be ZCn+1, a focusing command signal assumed to be FCn+1, and data of an applicable proximate plane assumed to be (Czi'j', Cfi'j', Di'j'), the driving amount δZn+1 can be obtained by a formula of "δZn=(1/Czi'j')×(ωorg−Cfi'j'×FPn+1−Di'j')−ZPorg". As mentioned in the description of flow of operation of FIG. 2, the zoom command signal Z'Cn is obtained by adding together the zooming driving amount δZn and the zooming position signal ZPorg for the reference angle of view, which are obtained in the above-stated manner. By using the zoom command signal Z'Cn, lens position control can be carried out to eliminate any changes brought about in angle of view by focusing.

The embodiment is arranged, as mentioned above, to use the zooming and focusing position signals in computing the reference angle of view. However, the same advantageous effects can be attained by changing this arrangement to replace these position signals with the zoom and focusing command signals obtained at the same sampling time. Further, the embodiment is arranged to obtain the zoom command signal by adding the zooming driving amount δZn for the angle-of-view correction to the reference zooming position signal ZPorg after the former is computed. However, the same advantages can be attained by changing that arrangement to directly compute the zoom command signal according to the following formula:

$$Z'Cn=(1/Czi'j')\times(\omega org-Cfi'j'\times FPn+1-Di'j').$$

As described above, according to the invention, a moving amount of a zooming lens to be used for correcting a change of angle of view resulting from driving of a focusing lens can be computed and obtained from a position signal or command signal for the focusing lens and a position signal or command signal for the zooming lens, without any such optical or mechanical changes that have been necessary according to the conventional arrangement. The moving amount of the zoom lens computed in this manner is added to the zoom command signal as offset data, whereby the position of the zooming lens is controlled. Accordingly, it is possible to provide a zoom lens capable of adequately controlling the position of the zooming lens in such a way as to eliminate a change of photo-taking angle of view resulting from focusing.

I claim:

1. A lens driving control apparatus for a zoom lens, comprising:

a zooming operation member for operating a zoom part of said zoom lens;

a focusing operation member for operating a focusing lens part of said zoom lens; and a control circuit for driving and controlling said zoom part, said control circuit computing information, inclusive of angle of view information, for driving of said zoom part for substantially preventing a change of angle of view resulting from movement of said focusing lens part, on the basis of an operation signal of said zooming operation member and an operation signal of said focusing operation member, and driving and controlling said zoom part in accordance with the computed information.

2. An apparatus according to claim 1, further comprising storage means for storing data required for computing the information about driving of said zoom part.

3. An apparatus according to claim 1, further comprising a prohibition circuit for prohibiting drive of said zoom part by said control circuit if it has been determined that the operation of the zoom part is performed by said zooming operation member.

4. An apparatus according to claim 1, wherein said control circuit further controls said zoom part on the basis of a position signal of said focusing lens part and a position signal of said zoom part.

5. A lens driving control apparatus for a zoom lens, having zoom and focusing lens parts, comprising:

means for determining positional movements of said focusing lens part which, in the course of zooming by said zoom part, give rise to changes in an angle of view of said zoom lens; and a control circuit for driving and controlling said zoom part to prevent said changes in the angle of view of said zoom lens.

6. An apparatus according to claim 5, wherein said positional movement determining means includes storage means storing a group of coefficients of a proximate plane passing at least three dividing points obtained with a zooming range of said zoom part and a focus shifting range of the focusing lens part, respectively, divided into parts at dividing points and with positions of the zoom part and the focusing lens part at the dividing points and an angle of view determined by the positions used as parameters in said control circuit.

7. A lens control apparatus for a zoom lens, having zoom and focusing lens parts, comprising:

a zoom information signal forming circuit for forming a zoom information signal of said zoom lens;

a focus information signal forming circuit for forming a focusing lens information signal of said zoom lens; and a computation circuit for computing a movement signal including a picture angle of said zoom part on the basis of said zoom information signal and said focusing lens information signal so as to prevent change of a picture angle of said zoom lens due to movement of said focusing lens part.

8. An apparatus according to claim 7, further comprising a zooming operation member for operating said zoom part and a focusing operation member for operating said focusing lens part, wherein said zoom information signal is an operation signal for said zooming operation member and said focusing lens information signal is an operation signal for said focusing operation member.

9. An apparatus according to claim 8, wherein said zoom information signal includes a positional signal of said zoom part and said focusing lens information signal includes a positional signal of said focusing lens part.

10. An apparatus according to claim 9, further comprising a computation circuit for computing picture angle information on the basis of the positional signal of said zoom part and the positional signal of said focusing lens part.

11. An apparatus according to claim 8, further comprising a prohibition circuit for prohibiting drive of said zoom part by a control circuit if it has been determined that the operation of the zoom part is performed by said zooming operation member.

12. An apparatus according to claim 7, further comprising a drive control circuit for controlling the drive of said zoom part on the basis of results of computation by the computation circuit.

13. An apparatus according to claim 12, wherein said drive control circuit further controls said zoom part on the basis of at position signal of said focusing lens part and a position signal of said zoom part.

* * * * *

UNITED STATES PATENT AND TRADEMARK OFFICE
CERTIFICATE OF CORRECTION

PATENT NO. : 6,134,390
DATED : October 17, 2000
INVENTOR(S) : Junichi Kasuya

It is certified that error appears in the above-identified patent and that said Letters Patent is hereby corrected as shown below:

Column 6,
Line 63, delete "at an dividing" and insert -- at an i-th dividing --.

Signed and Sealed this

Eighteenth Day of December, 2001

Attest:

Attesting Officer

JAMES E. ROGAN
Director of the United States Patent and Trademark Office